(12) United States Patent
Scolaro et al.

(10) Patent No.: US 12,280,667 B2
(45) Date of Patent: Apr. 22, 2025

(54) INSTRUMENT CLUSTER DISPLAY OBSCURATION TOOL

(71) Applicant: GM GLOBAL TECHNOLOGY OPERATIONS LLC, Detroit, MI (US)

(72) Inventors: Christopher P. Scolaro, Rochester, MI (US); Joseph Smeltzer, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 18/350,225

(22) Filed: Jul. 11, 2023

(65) Prior Publication Data

US 2025/0018791 A1    Jan. 16, 2025

(51) Int. Cl.
*B60K 35/00* (2024.01)
*G06F 3/01* (2006.01)
*B60K 35/21* (2024.01)
*B60K 35/29* (2024.01)

(52) U.S. Cl.
CPC .............. *B60K 35/00* (2013.01); *G06F 3/013* (2013.01); *B60K 35/213* (2024.01); *B60K 35/29* (2024.01); *B60K 2360/18* (2024.01)

(58) Field of Classification Search
CPC ....... G06F 3/013; B60K 35/00; B60K 35/213; B60K 35/29; B60K 2360/18; B60K 35/23; B60K 2360/149; B60K 35/10; B60K 35/22; B60K 35/28; B60K 35/60

USPC ......................................................... 340/461
See application file for complete search history.

(56) References Cited

U.S. PATENT DOCUMENTS

| | | | |
|---|---|---|---|
| 9,841,813 B2 * | 12/2017 | Srail | G06F 3/013 |
| 2016/0116977 A1 | 4/2016 | Goldman-Shenhar | |
| 2020/0081527 A1 | 3/2020 | Agaoglu et al. | |
| 2020/0348751 A1 * | 11/2020 | Beineke | B60K 35/60 |
| 2021/0089120 A1 | 3/2021 | Grimm et al. | |
| 2022/0289151 A1 | 9/2022 | Song et al. | |

FOREIGN PATENT DOCUMENTS

| | | |
|---|---|---|
| DE | 102014113308 A1 | 3/2015 |
| DE | 102021100241 A1 | 7/2022 |

\* cited by examiner

*Primary Examiner* — Eric Blount
(74) *Attorney, Agent, or Firm* — Quinn IP Law

(57) ABSTRACT

A display obscuration tool for identifying one or more obscured zones within a display, such as surface areas of the display blocked from view. The tool may include a spatial detection module configured for determining a relative positioning between a display onboard a vehicle, a steering wheel or other implement onboard the vehicle, and a driver, and a gaze detection module configured for determining a field of view for the driver. The tool may further include an obscuration module configured for identifying one or more obscured zones based at least in part on the relative positioning and the field of view.

17 Claims, 4 Drawing Sheets

INSTRUMENT CLUSTER DISPLAY OBSCURATION TOOL

INTRODUCTION

The present disclosure relates to identifying one or more obscured zones within a display, such as but not necessarily limited to a display obscuration tool configured for identifying obscured zones within an instrument cluster display of a vehicle.

The growth in size, positioning, etc. of displays in general, and in particular instrument cluster displays typically included within vehicles, may create active display areas that may be permanently or periodically blocked from view by a steering wheel or other implement onboard a vehicle. These obscured zones may result in surface areas or other portions of the display being intermittently blocked from occupant view, with the information intended to be presented therethrough being attenuated or entirely prevented from reaching the viewer in the intended manner. Instrument cluster displays and other types of displays have historically been designed relative to dimensional ranges representative of common viewers, e.g., based on a median range of anthropometric attributes selected for the average male and female viewer. As a result, the obscured zones of a display may relatedly vary from person to person according to anthropometry variances, changes in relative positioning between the viewer and the display, changes or alternations in positioning of a steering wheel or other implement disposed between the display and the viewer, and for a wide variety of other reasons.

The obscured zones of the display may vary depending on the viewer, vehicle operation, viewer positioning and preferences, etc. Such person-to-person variances in obscuration, and the attendant variances in the information being blocked, may undesirably affect an ability of vehicle systems to present information across a variable range of viewing occupants.

SUMMARY

One non-limiting aspect of the present disclosure relates to a display obscuration tool configured for determining obscured zones within a display, such as but not necessarily limited to determining obscured zones within an instrument cluster of a vehicle. The obscured zones may be identified across a wide range of viewing occupants, optionally with corresponding obscuration messages being generated to notify other systems onboard the vehicle of a potential inability to reliably present information through one of the obscured zones. One non-limiting aspect of the present disclosure contemplates the obscuration tool being particularly helpful in identifying obscured zones within a display of an instrument cluster when the display is being blocked from occupant view by a steering wheel or other implement onboard the vehicle.

One non-limiting aspect of the present disclosure relates to a display obscuration tool. The tool may include a spatial detection module configured for determining a relative positioning between an instrument cluster display, a steering wheel, and a driver of a vehicle. The tool may include a gaze detection module configured for determining a field of view for the driver relative to the instrument cluster display and an obscuration module configured for identifying one or more obscured zones within the instrument cluster display based at least in part on the relative positioning and the field of view. The obscured zones may identify surface areas of the instrument cluster display that the driver is unable to view due to the steering wheel obscuring the field of view.

The obscuration module may be configured for performing an umbra obscuration process to identify the obscured zones. The umbra obscuration process may include determining a geometry of the steering wheel within the field of view, determining one or more display shadows cast upon the instrument cluster display from the steering wheel obscuring the field of view, and determining the obscured zones to coincide with the surface areas covered with the display shadows.

The obscuration module may be configured for performing a point cloud obscuration process to identify the obscured zones. The point cloud obscuration process may include determining a geometry of the steering wheel within the field of view, determining a minimum distance line between the instrument cluster display and the steering wheel, and determining the obscured zones to coincide with the surface areas intersecting with the minimum distance line.

The gaze detection module may be configured for determining the field of view based on an eye point and a gaze angle of the driver.

The obscuration module may be configured for transmitting an obscuration message to one or more systems onboard the vehicle having an indicator within one of the obscured zones, optionally with the obscuration message identifying one or more of the obscured zones.

The obscuration module may be configured for transmitting an updated obscuration message to one or more systems onboard the vehicle having an indicator within one or more updated obscured zones. The updated obscured zones may identify surface areas of the instrument cluster that the driver may be unable to view due to a change in position for one or more of the steering wheel, the driver, the field of view, and a seat occupied by the driver.

One non-limiting aspect of the present disclosure relates to a display obscuration tool. The display obscuration tool may include a spatial detection module configured for determining a relative positioning between an instrument cluster display, a steering wheel, and a driver of a vehicle, a gaze detection module configured for determining a field of view for the driver, and an obscuration module configured for identifying one or more obscured zones within the instrument cluster display based at least in part on the relative positioning and the field of view.

The obscuration module may be configured for identifying the obscured zones to correspond with surface areas of the instrument cluster display with the field of view blocked by the steering wheel.

The spatial detection module may be configured for determining a wheel geometry of the steering within the field of view and identifying the obscured zones to correspond with surface areas of the instrument cluster display within the field of view obstructed by at least a portion of the wheel geometry.

The obscuration module may be configured for performing an umbra obscuration process to identify the obscured zones.

The obscuration module may be configured for performing a point cloud obscuration process to identify the obscured zones.

The gaze detection module may be configured for determining the field of view based on driver awareness data generated with a driver awareness system included onboard the vehicle.

The driver awareness data may include at least an eye point and a gaze angle for the driver.

The obscuration module may be configured for transmitting an obscuration message to apprise one or more systems onboard the vehicle that an indicator associated therewith may be being obscured within one of the obscured zones.

One non-limiting aspect of the present disclosure relates to method for detecting display obscuration. The method may include determining a display geometry for an instrument cluster display within a vehicle, determining a wheel geometry for a steering wheel within the vehicle, determining a field of view for a driver of the vehicle, and detecting one or more obscured zones within the instrument cluster display based at least in part on the display geometry, the wheel geometry, and the field of view. The obscured zones may identify surface areas of the instrument cluster display within the field of view blocked from driver view by the steering wheel.

The method may include determining one or more display shadows cast upon the instrument cluster display from the steering wheel obscuring the field of view and determining the obscured zones to coincide with the surface areas covered with the display shadows.

The method may include determining a minimum distance line between the instrument cluster display and the steering wheel and determining the obscured zones to coincide with the surface areas intersecting with the minimum distance line.

The method may include determining the field of view based on driver awareness data generated with a driver awareness system included onboard the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to plain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
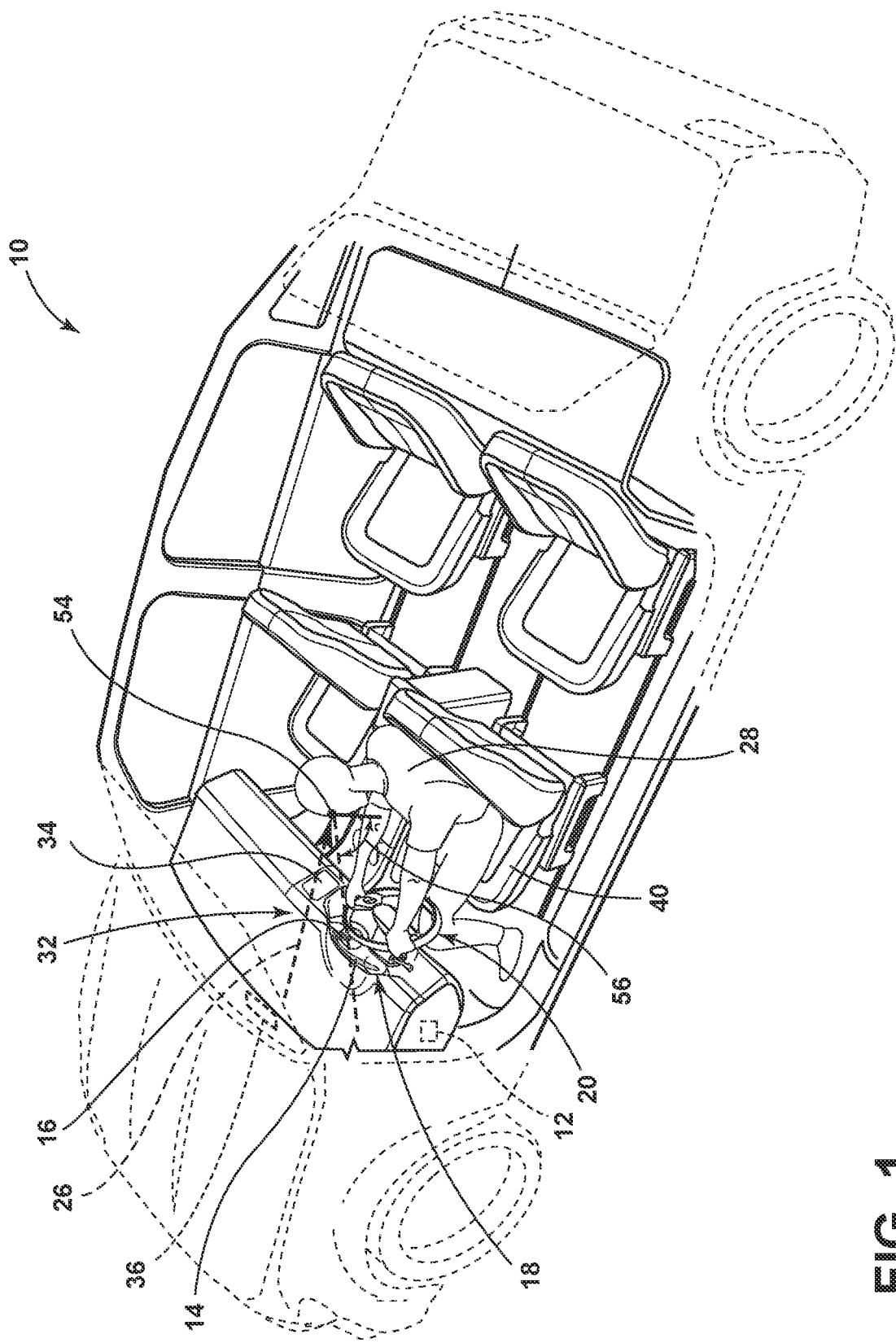
FIG. 1 illustrates a vehicle having an obscuration tool in accordance with one non-limiting aspect of the present disclosure.

FIG. 1 illustrates a vehicle 10 having an obscuration tool 12 in accordance with one non-limiting aspect of the present disclosure. The obscuration tool 12 is predominantly presented for non-limiting purposes with respect to being one of a plurality of vehicle systems (not individually shown) included onboard the vehicle 10. The obscuration tool 12 is described with respect to identifying obscured zones 14, 16 within a display 18 of the vehicle 10 due to the attendant vehicle 10 environment being representative of one of the many completed environments whereby one or more surface areas of the display 18 may be intermittently, periodically, permanently, or otherwise obscured from view. The corresponding obscuration, particularly for the illustrated arrangement of the vehicle 10, may result from a steering wheel 20 obstructing a field of view 26 of an occupant 28. The occupant 28 is shown for non-limiting purposes to correspond with a driver of the vehicle 10 as the present disclosure fully contemplates performing similar obscuration processes for additional occupants within the vehicle 10 and/or others offboard the vehicle 10 attempting to view the display 18. The vehicle 10 is also presented for non-limited purposes as the present disclosure fully contemplates the obscuration tool 12 being useful with other devices, etc. whereby the display 18 may be position relative to other blocking elements besides the steering wheel 20 or other implement included onboard a vehicle 10.

The display 18 is shown as being included behind the steering wheel 20 and as part of an instrument cluster 32 for non-limiting purposes as the present disclosure fully contemplates the display 18 being located elsewhere within the vehicle 10 and/or the vehicle 10 including additional displays, such as a central display 34, a heads-up display 36, etc. The obscuration tool 12, accordingly, may be configured in the manner described herein to facilitate determining obscured zones 14, 16, block portions, hidden sections, etc. for the display 18, as well as for other displays 34, 36 within the vehicle 10 and/or for displays included within other, non-vehicle 10 environments. The illustrated use of the obscuration tool 12 in the vehicle 10 is believed to be particularly beneficial in highlighting the improvements resulting from the capabilities of the present disclosure to identify the obscured zones 14, 16 across a wide range of variables. The obscuration tool 12 may be used in this manner to identify the obscured zones 14, 16 for occupants 28 having differing anthropometric characteristics, in response to occupants 28 changing positioning of themselves and/or vehicle components relative to the display 18, e.g., moving a driver seat 40 and/or the steering wheel 20, and/or for any number of other reasons, such as to account for temporary obstructions, after-market vehicle 10 add-ons, etc.

The obscuration tool 12 may be configured as an electronic control unit (ECU), a module, a software construct, or other logically functioning element having capabilities sufficient to facilitate the operations described herein for determining and communicating information for the obscured zones 14, 16. The obscuration tool 12 may include a computer-readable storage medium having a plurality of non-transitory instructions stored thereon, which when executed with one or more processors, may be sufficient for executing or otherwise facilitating the methods, processes, operations, and other aspects of the present disclosure. The obscuration tool 12 may include capabilities for communicating with the other systems included onboard the vehicle 10 and/or with other devices, systems, etc. included offboard the vehicle 10, such as to facilitate communications between other vehicles, a back office, a wireless network, etc. The capabilities of the obscuration tool 12 to communicate with other systems onboard and/or offboard the vehicle 10 may be beneficial in enabling the obscuration tool 12 to provide notifications, control actions, messages, information, etc. associated with the obscured zones 14, 16 thereto.

This identification of the obscured zones 14, 16 may be useful to apprise systems attempting to present information through the obscured zones 14, 16 of the possibility that the corresponding information may not reach the intended recipient, e.g., that it may be blocked by the steering wheel 20 or other implement onboard the vehicle 10. While the present disclosure contemplates the identification of the obscured zones 14, 16 being useful for other purposes and to assist in undertaking a wide range of corrective actions, the present disclosure is not intended to be limited to a particular use thereof. As such, and while the present disclosure fully contemplates using the identification of the obscured zones 14, 16 to change how information is being presented through the display 18, e.g., by moving indicators or other indicia to other unobscured zones (i.e., surface areas of the display 18 outside of the obscured zones 14, 16), this is done merely for illustrative purposes and for assisting in illuminating the benefits associated with the capabilities of the present disclosure to identify the obscured zones 14, 16 across a wide range of variables, occupants 28, anthropometric characteristics, seat positioning, steering wheel positioning, etc.

Figure 2:
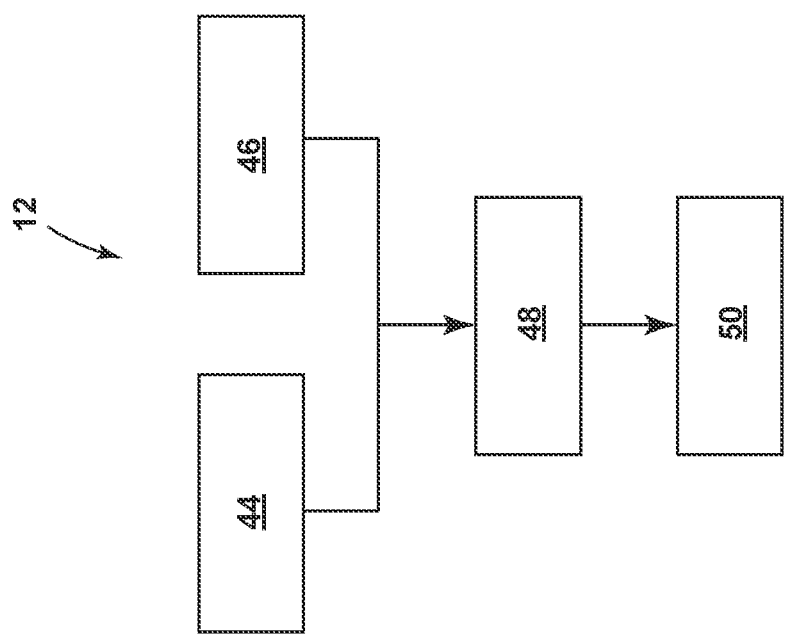
FIG. 2 illustrates a schematic diagram of the obscuration tool in accordance with one non-limiting aspect of the present disclosure.

FIG. 2 illustrates a schematic diagram of the obscuration tool 12 in accordance with one non-limiting aspect of the present disclosure. The obscuration tool 12 may include a spatial detection module 44, a gaze detection module 46, and an obscuration module 48. The modules 44, 46, 48 may be included as part of a singular device included onboard the vehicle 10 and/or representations of processes executing on or in cooperation with one or more systems onboard or offboard the vehicle 10. The calculations, processes, methodologies, operations, etc. described herein with respect to the spatial detection, date gaze detection, and obscuration modules 44, 46, 48 are presented for non-limiting purposes as the present disclosure fully contemplates those processes being performed across other modules, both onboard and/or offboard the vehicle 10. The obscuration module 48 is also shown for non-limiting purposes with respect to generating a notification 50, e.g. an obscuration message, for communication to one or more systems onboard and/or offboard the vehicle 10. The notification 50 may be used to apprise the recipients thereof as to the obscured zones 14, 16, such as by individually identifying each obscured zones 14, 16 relative to corresponding surface areas of the display 18.

The spatial detection module 44 may be configured for interacting with various systems included onboard the vehicle 10 to determine a relative positioning of the occupant 28 to the display 18, the instrument cluster 32, the steering wheel 20, and/or other implements, devices, displays, reference locations, points, etc. within the vehicle 10. The relative positioning may be embodied in a dataset having metrics, geometries, dimensions, calculations, vectors, etc. sufficient for geometrically mapping the occupant 28, or more specifically selectable body parts of the occupant 28, relative to any reference point within the vehicle 10. The spatial detection module 44 may be configured in this manner to effectively map spatial coordinates between any definable surface within the vehicle 10, including those associated with the occupant 28 and structures, devices, etc. within the vehicle 10. The resulting spatial coordinates may be used to define the relative spatial positioning of the occupant 28 to the display 18 or other area within the vehicle 10 for which the obscured zones 14, 16 may be determined. The spatial detection module 44, for example, may be configured for communicating with systems sensors included onboard the vehicle 10 for monitoring driver awareness, steering column positioning, seat positioning, etc.

The gaze detection module 46 may be configured for interacting with various systems included onboard the vehicle 10 to determine the field of view 26 for the driver relative to the instrument cluster 32. The gaze detection module 46, for example, may interact with the driver awareness system, cameras, occupant detection devices, etc. to determine an eye point 54 and a gaze angle 56 of the driver 28. The eye point 54 and the gaze angle 56 may be analyzed to determine or estimate the field of view 26. The field of view 26 may vary as the occupants eye point 54, viewing direction, etc. varies, with the gaze detection module 46 may account for when determining the field of view 26. The field of view 26 with respect to viewing the instrument cluster display 18 may be based on a cone or other representation of the field of view 26 associated with a line of sight to the instrument cluster 32. As the line of sight, and thereby the corresponding field of view 26, may change relatively rapidly, the gaze detection module 46 may be configured for determining the field of view 26 in concert with such movements and/or based on estimates, averages, or other processing techniques helpful to prevent hysteresis and other unstable calculations. The gaze detection module 46 may be configured in this manner to determine the field of view 26 with respect to how the occupant 28 may view the display 18.

The obscuration module 48 may be configured for interacting with various systems included onboard the vehicle 10 to the identify one or more of the obscured zones 14, 16 within the display 18. The obscured zones 14, 16 may be determined based at least in part on the relative positioning and the field of view 26. The obscured zones 14, 16, for example, may be identified according to surface areas of the display 18 that the occupant 28, i.e., driver, is unable to view due to the steering wheel 20 obscuring the field of view 26 or other implement being located within the field of view 26 between the occupant 28 and the display 18, i.e., within a line of sight extending between the occupant 28 and the display 18. The obscuration tool 12 may be configured to utilize the geometries, dimensions, vectors, distances, etc. or other information ascertained by the spatial detection module 44 when determining the relative positioning. This information may be coupled with the field of view 26 to identify obstructing objects within the vehicle 10 between the display 18 and the eye point 54, i.e., the steering wheel 20 or other implement within the vehicle 10. As noted above, the present disclosure is predominately described with respect to determining the obscured zones 14, 16 based on the steering wheel 20 blocking one or more portions of the display 18, however, similar methodologies may be utilized for determining other obscured zones 14, 16 within the vehicle 10 and/or blind spots outside of the vehicle 10.

Figure 3:
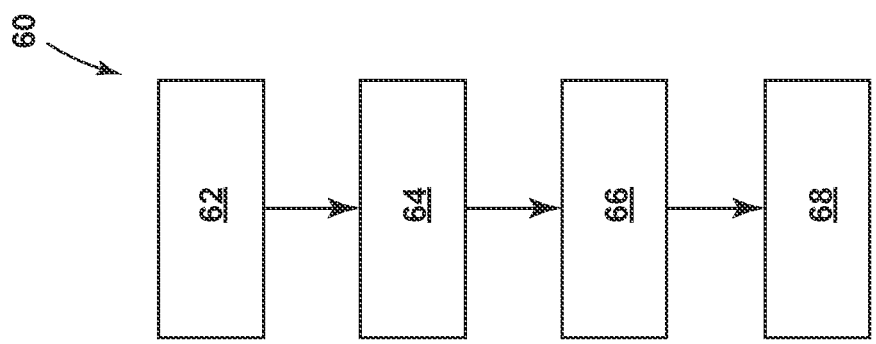
FIG. 3 illustrates a flowchart of a method for detecting display obscuration in accordance with one non-limiting aspect of the present disclosure.

FIG. 3 illustrates a flowchart of a method 60 for detecting display 18 obscuration in accordance with one non-limiting aspect of the present disclosure. The method 60 may be embodied in the computer-readable storage medium of the obscuration tool 12 and/or portions, processes, etc. thereof may be dispersed across systems, features, etc. included onboard and offboard the vehicle 10. The method 60 is predominantly described with respect to the obscuration tool 12, or more particularly the spatial detection, gaze detection, and obscuration modules 44, 46, 48 associated therewith, cooperating with other vehicle-related systems to determine the field of view 26 for the occupant 28 and whether one or more objects within the vehicle 10 may be disposed within that field of view 26 between the eye point 54 and one or more displays 18, 34, 36 through which information may be intended for communication to the occupant 28. The method may be useful in this manner to identify obscured zones 14, 16 or other portions of the display 18 through which information may be prevented from reaching occupant 28.

Block 62 relates to a display 18 geometry process for identifying a display geometry for the display 18 intended to be analyzed for detecting display obscuration. The display geometry may relate to identifying geometries, distances, dimensions, sizes, shapes, orientations, etc. for the instrument cluster display 18 and its relative position within the vehicle 10. Block 64 relates to an object geometry process for identifying a wheel geometry for the steering wheel 20 or other object intended for analysis. The wheel geometry may relate to identifying geometries, distances, dimensions, sizes, shapes, orientations, etc. for the steering wheel 20 and its features and relative position within the vehicle 10. Block 66 relates to a field of view 26 process for determining a field of view 26 for the occupant 28, which in the illustrated embodiment may correspond with a driver of the vehicle 10. The field of view 26 may be represented as a cone or other three-dimensional shape capable of identifying the metes and bounds of the occupant's viewing capabilities. Block 68 relates to an obscuration process for detecting one or more obscured zones 14, 16 within the display 18. The obscured zones 14, 16 may be identified based at least in part on the display 18 geometry, the wheel geometry, and the field of view 26 and correspond with surface areas of the display 18 within the field of view 26 blocked by the steering wheel 20 or other obstructing object. The obscuration process may optionally include transmitting the notification 50 or otherwise communicating the obscured zones 14, 16 to other systems.

Figure 4:
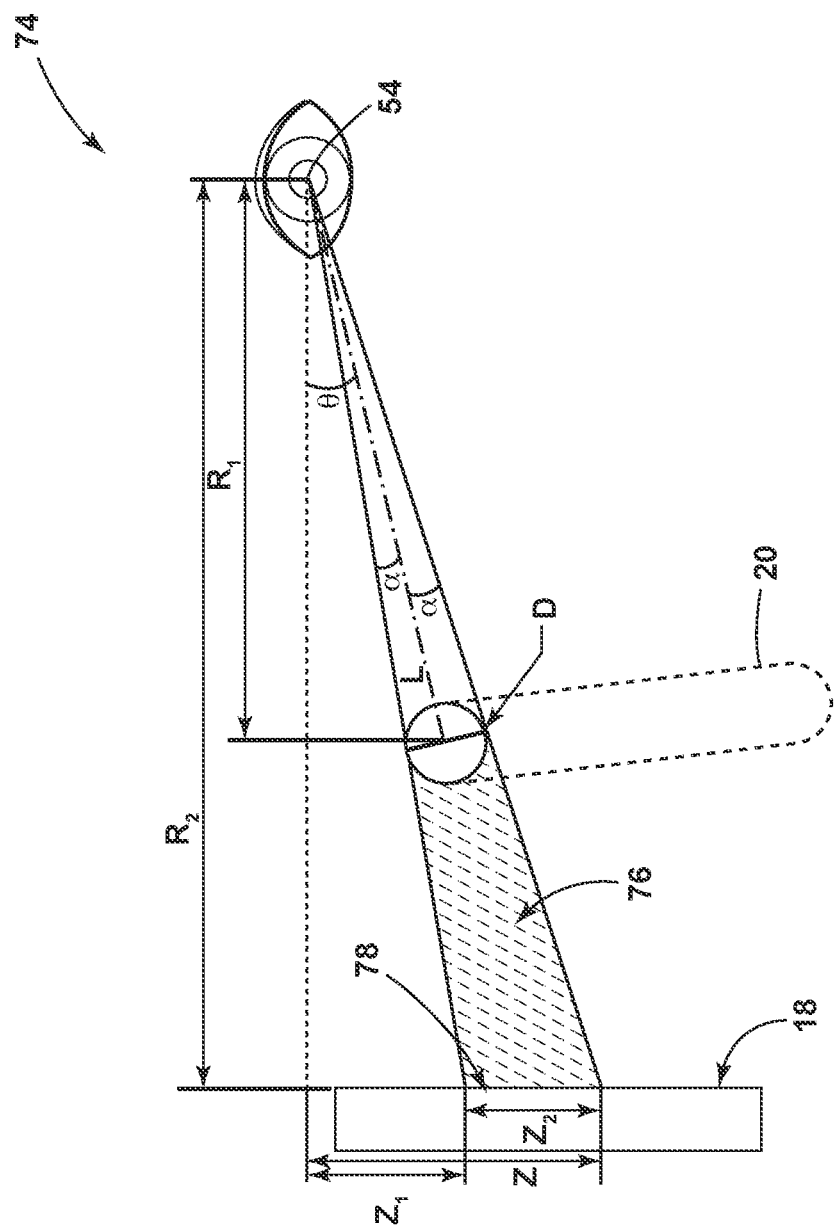
FIG. 4 schematically illustrates an umbra obscuration process for identifying the obscured zones in accordance with one non-limiting aspect of the present disclosure.

FIG. 4 illustrates schematically illustrates an umbra obscuration process 74 for identifying the obscured zones 14, 16 in accordance with one non-limiting aspect of the present disclosure. The umbra obscuration process 74 may be included as part of the obscuration detection method 60 to facilitate determining the obscured zones 14, 16 based on one or more shadows 76 cast by an obstructing object 20, which is illustrated for non-limiting purposes to correspond with an arcuate portion of the steering wheel 20 generating a shadow 76 that covers a portion of the display 18. The obscured zones 14, 16 may be determined to correspond with s surface area 78 covered with the shadow 76, which may optionally include disparate or different portions of the display 18 depending on the wheel geometry, e.g., there may be separate or independent shadows 76 cast on the display 18 by different portions of the steering wheel 20 or elements structures, etc. attached thereto, such as by a turn signal switch or lever extending from a steering column of the steering wheel 20. A vertical dimension $Z_2$ for the surface area 78 obscured by the steering wheel 20 in the illustrated example, i.e., the vertical distance $Z_2$ corresponding with the shadow 76 cast upon the display 18, may be identified based on mathematical relationships between the eye point 54 of the occupant 28, the steering wheel 20, and the display 18.

The mathematical relationship for identifying the vertical dimension $Z_2$ may be determined according to the following equation:

$$Z_2 = R_s\left(\tan\left(\theta + \tan^{-1}\left(\frac{D\cos\theta}{2R_1}\right)\right) - \tan\left(\theta - \tan^{-1}\left(\frac{D\cos\theta}{2R_1}\right)\right)\right) \quad \text{(eq. 1)}$$

where:

$$L = \frac{R_1}{\cos\theta};$$

$$\alpha = \tan^{-1}\left(\frac{D}{2L}\right);$$

$$Z = R_2 \tan(\theta + \alpha);$$

$$Z_1 = R_2 \tan(\theta - \alpha);$$

$$Z_2 = Z - Z_1; \text{ and}$$

$R_1, R_2, \theta,$ and $D$ are known.

Figure 5:
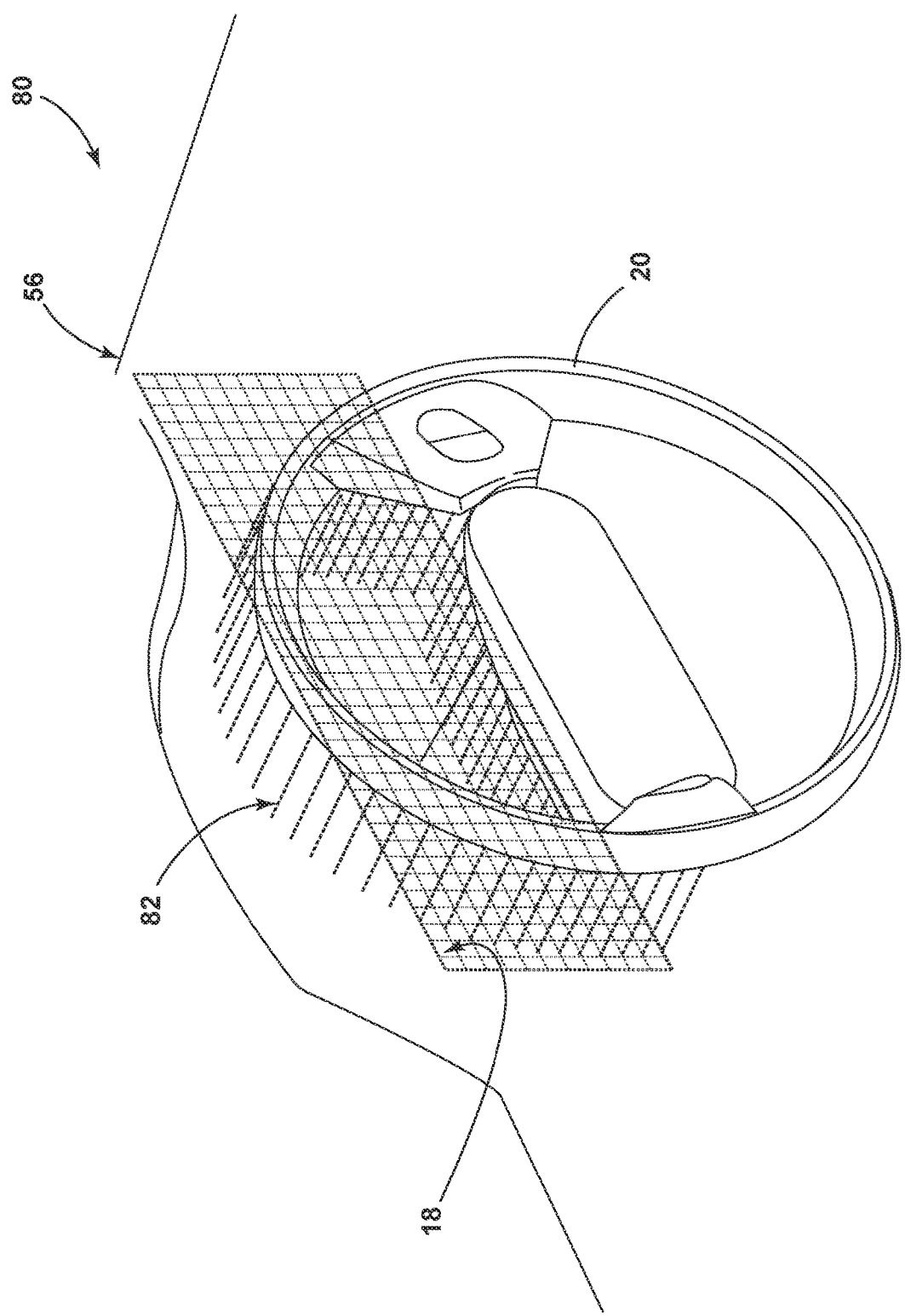
FIG. 5 schematically illustrates a point cloud obscuration process for identifying the obscured zones in accordance with one non-limiting aspect of the present disclosure.

FIG. 5 illustrates schematically illustrates a point cloud obscuration process 80 for identifying the obscured zones 14, 16 in accordance with one non-limiting aspect of the present disclosure. The point cloud process 80 may be included as part of the obscuration detection method 60 to facilitate determining the obscured zones 14, 16 based on estimating a plurality of minimum distance lines 82 between the display 18 and the steering wheel 20 within the field of view 26, i.e., corresponding with the gaze angle 56. The obscured zones 14, 16 may correspond with each portion of the display 18 having a surface area intersecting with one of the minimum distance lines 82. The illustrated example may include defining the display 18 to include a plurality of screen points (each shown with +) such that each of the minimum distance lines 82 intersecting therewith corresponds with one of the obscured zones 14, 16 of the display 18. The point cloud process 80 may utilize directional vector data of the minimum distance lines 82 to "project", along that vector, a cloud of points representing the steering wheel 20 onto the display 18 which could also be represented by a set of points. The obscured zones 14, 16 created by the projected steering wheel points that overlap cluster points may represent obscured points for providing an obscuration map for the display 18, e.g., a pixel-level representation of obscured and unobscured areas.

As supported above, one non-limiting aspect of the present disclosure relates to an obscuration tool 12 determining which areas of a display in an instrument cluster may be obscured from the driver's vision by the steering wheel. The obscuration tool 12 may be configured for using existing driver awareness sensors to determine the drivers gaze and eye point along with a steering wheel position sensor to determine the obscuration zone. The obscuration tool 12 may create a dynamic obscuration zone, tailored to the current driver's selected seating and steering wheel position rather than a generic obscuration zone based on standards. This information may then be made available in a format which the vehicle can use. The obscuration tool 12 may be beneficial for use with driver awareness sensors and steering column position sensors to calculate the actual display area obscured from the driver's perspective. The creation of a dynamic obscuration zone, which may change based on driver anthropometry and seating position, may improve methods for communication through displays with vehicle occupants. This calculated obscuration zone may be updated as the steering column position or the occupant position are adjusted. This calculation may be accomplished using an algorithm and geometric mathematics. The obscuration tool 12 may allow the vehicle to know exactly what areas are obscured for every occupant in every seating position and to personalize memory features, e.g., how information is displayed to various occupants 28 to avoid obscuration.

The obscuration zones may be calculated using an algorithm similar to that used for mapping the umbra of solar and lunar eclipses. Based on the distance between each point on the steering wheel and the position of the drivers eye, the obscuration tool 12 may calculate the size and position of the obscured area behind the steering wheel. The cross-section of the steering wheel and the distance between the wheel on the display 18 may influence the size of the obscured area. Using this data and a rough approximation of the visible area of the cluster with a point map or point cloud you calculate what parts of the display 18 are visible. The obscuration zones may also be calculated using a minimum distance line between the eye point and the display cluster. The directional vector data of this line could be used to "project", along that vector, a cloud of points representing the steering wheel onto the display which could also be represented by a set of points. The zones created by the projected steering wheel points that overlap cluster points would represent obscured points providing an obscuration map. The umbra algorithm option may provide a more accurate map of the obscured area but may also require more calculating power. The point projection option may require less calculating power but may be less accurate than the umbra calculations. This information could be used with other aspects of vehicle telemetry to improve the customer experience.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A display obscuration tool, comprising:
   a spatial detection module configured for determining a relative positioning between an instrument cluster display, a steering wheel, and a driver of a vehicle;
   a gaze detection module configured for determining a field of view for the driver relative to the instrument cluster display; and
   an obscuration module configured for identifying one or more obscured zones within the instrument cluster display based at least in part on the relative positioning and the field of view, the obscured zones identifying surface areas of the instrument cluster display that the driver is unable to view due to the steering wheel obscuring the field of view;
   wherein the obscuration module is configured for performing an umbra obscuration process to identify the obscured zones and the umbra obscuration process includes;
      determining a geometry of the steering wheel within the field of view;
      determining one or more display shadows cast upon the instrument cluster display, the display shadows resulting from the steering wheel obscuring the field of view; and
      determining the obscured zones to coincide with the surface areas covered with the display shadows.

2. The display obscuration tool according to claim 1, wherein:
   the gaze detection module is configured for determining the field of view based on an eye point and a gaze angle of the driver.

3. A display obscuration tool, comprising:
   a spatial detection module configured for determining a relative positioning between an instrument cluster display, a steering wheel, and a driver of a vehicle;
   a gaze detection module configured for determining a field of view for the driver relative to the instrument cluster display; and
   an obscuration module configured for identifying one or more obscured zones within the instrument cluster display based at least in part on the relative positioning and the field of view:
   wherein th obscuration module is configured for identifying the obscured zones to correspond with surface areas of the instrument cluster display with the field of view blocked by the steering wheel and the obscuration module is configured for performing a point cloud obscuration process to identify the obscured zones and the point cloud obscuration process includes:
   determining a geometry of the steering wheel within the field of view;
   determining a minimum distance line between the instrument cluster display and the steering wheel; and
   determining the obscured zones to coincide with the surface areas intersecting with the minimum distance line.

4. The display obscuration tool according to claim 3, wherein:
   the spatial detection module is configured for:
      determining a wheel geometry of the steering wheel within the field of view; and
      identifying the obscured zones to correspond with surface areas of the instrument cluster display within the field of view obstructed by at least a portion of the wheel geometry.

5. The display obscuration tool according to claim 4, wherein:
   the gaze detection module is configured for determining the field of view based on driver awareness data generated with a driver awareness system included onboard the vehicle.

6. The display obscuration tool according to claim 5, wherein:
   the driver awareness data includes at least an eye point and a gaze angle for the driver.

7. The display obscuration tool according to claim 4, wherein:
   the obscuration module is configured for transmitting an obscuration message to apprise one or more systems onboard the vehicle that an indicator associated therewith is being obscured within one of the obscured zones.

8. A method for detecting display obscuration, comprising:
   determining a display geometry for an instrument cluster display within a vehicle;
   determining a wheel geometry for a steering wheel within the vehicle;
   determining a field of view for a driver of the vehicle; and
   detecting one or more obscured zones within the instrument cluster display based at least in part on the display geometry, the wheel geometry, and the field of view, the obscured zones identifying surface areas of the instrument cluster display within the field of view blocked from driver view by the steering wheel,
   determining a minimum distance line between the instrument cluster display and the steering wheel; and
   determining the obscured zones to coincide with the surface areas intersecting with the minimum distance line.

9. The method according to claim 8, further comprising:
   determining one or more display shadows cast upon the instrument cluster display from the steering wheel obscuring the field of view; and
   determining the obscured zones to coincide with the surface areas covered with the display shadows.

10. The method according to claim 8, further comprising:
   determining the field of view based on driver awareness data generated with a driver awareness system included onboard the vehicle.

11. The method of claim 10, wherein:
   the driver awareness data includes at least an eye point and a gaze angle for the driver.

12. The method according to claim 8, further comprising:
   selecting a location on the instrument cluster display to present information based on the one or more obscured zones.

13. The method to claim 8, wherein:
   detecting one or more obscured zones is performed utilizing a point cloud obscuration process to identify the obscured zones.

14. The display obscuration tool according to claim 3, wherein:
   the relative positioning between the instrument cluster display, the steering wheel, and the driver of the vehicle includes a dataset having at least one of metrics, geometries, dimensions, calculations, or vectors for geometrically mapping the driver.

15. The display obscuration tool according to claim 7, wherein:
   the obscuration module is configured for transmitting an updated obscuration message to one or more systems onboard the vehicle having an indicator within one or more updated obscured zones, the updated obscured zones identifying surface areas of the instrument cluster display that the driver is unable to view due to a change in position for one or more of the steering wheel, the driver, the field of view, and a seat occupied by the driver.

16. The method according to claim 8, wherein:
   transmitting an obscuration message to one or more systems onboard the vehicle having an indicator within one of the obscured zones, the obscuration message identifying one or more of the obscured zones.

17. The method to claim 16, wherein:
   transmitting an updated obscuration message to one or more systems onboard the vehicle having an indicator within one or more updated obscured zones, the updated obscured zones identifying surface areas of the instrument cluster display that the driver is unable to view due to a change in position for one or more of the steering wheel, the driver, the field of view, and a seat occupied by the driver.

* * * * *